(12) United States Patent
Kim et al.

(10) Patent No.: US 7,885,370 B2
(45) Date of Patent: Feb. 8, 2011

(54) METHOD AND SYSTEM FOR EARLY SENSING OF WATER LEAKAGE, THROUGH CHEMICAL CONCENTRATION MONITORING, IN NUCLEAR REACTOR SYSTEM USING LIQUID METAL AND MOLTEN SALT

(75) Inventors: Tae-Joon Kim, Daejeon (KR); Ji-Young Jeong, Daejeon (KR)

(73) Assignees: Korea Atomic Energy Research Institute, Daegeon (KR); Korea Hydro & Nuclear Power Co., Ltd., Daegeon (KR)

( * ) Notice: Subject to any disclaimer, the term of this patent is extended or adjusted under 35 U.S.C. 154(b) by 0 days.

(21) Appl. No.: 11/890,985

(22) Filed: Aug. 8, 2007

(65) Prior Publication Data

US 2008/0292041 A1 Nov. 27, 2008

(30) Foreign Application Priority Data

May 23, 2007 (KR) ...................... 10-2007-0050506

(51) Int. Cl.
*G21C 17/00* (2006.01)
*G21C 23/00* (2006.01)

(52) U.S. Cl. ...................................... 376/250; 376/340
(58) Field of Classification Search ................. 376/250, 376/340
See application file for complete search history.

(56) References Cited

U.S. PATENT DOCUMENTS 2,766,442 A * 10/1956 Meyer, Jr. .................. 165/11.1
4,090,554 A * 5/1978 Dickinson .................. 165/11.1
5,132,075 A 7/1992 Asakura et al.
6,062,068 A * 5/2000 Bowling ......................... 73/40
6,561,265 B2 * 5/2003 Ohira et al. ................. 165/154

FOREIGN PATENT DOCUMENTS

| JP | 55015040 | 2/1980 |
| JP | 61086629 | 5/1986 |
| JP | 09222375 | 8/1997 |
| JP | 2000249784 | 9/2000 |

OTHER PUBLICATIONS

Collier, James and Hewitt, Geoffrey, Introduction to Nuclear Power, 1987, Taylor & Francis, p. 65, http://books.google.com/books?id=2KYVftKE9NUC&printsec=frontcover#PPA65,M1 .*

* cited by examiner

*Primary Examiner*—Rick Palabrica
*Assistant Examiner*—Erin M Boyd
(74) *Attorney, Agent, or Firm*—Marshall, Gerstein & Borun LLP

(57) ABSTRACT

A method of early sensing of water leakage, through chemical concentration monitoring, in a nuclear reactor system using a liquid metal and molten salt, the method including: measuring an electrical conductivity and a mass spectrum of a first channel and a second channel of a heat-related device included in the nuclear reactor system using the liquid metal and the molten salt; calculating a first identification value associated with the water leakage in the heat-related device using the measured electrical conductivity; calculating a second identification value associated with the water leakage in the heat-related device using the measured mass spectrum; and sensing the water leakage by comparing a predetermined reference value and a summed identification value, the summed identification value being the sum of the first identification value and the second identification value.

5 Claims, 9 Drawing Sheets

METHOD AND SYSTEM FOR EARLY SENSING OF WATER LEAKAGE, THROUGH CHEMICAL CONCENTRATION MONITORING, IN NUCLEAR REACTOR SYSTEM USING LIQUID METAL AND MOLTEN SALT

CROSS-REFERENCE TO RELATED APPLICATION

This application claims the benefit of Korean Patent Application No. 10-2007-0050506, filed on May 23, 2007, in the Korean Intellectual Property Office, the disclosure of which is incorporated herein by reference.

BACKGROUND OF THE INVENTION

1. Field of the Invention

The present invention relates to a method and system for early sensing of water leakage, through chemical concentration monitoring, in a nuclear reactor system using a liquid metal and molten salt which prevents a shutdown, due to a crack, of a heat exchanger and a steam generator in the nuclear reactor system using the liquid metal and molten salt by early monitoring and reporting of the crack of the heat exchanger or the steam generator.

2. Description of Related Art

In nuclear power generation, materials with a nucleus possessing tremendous energy, such as Uranium, are used. Specifically, in nuclear power generation, tremendous energy, generated when atomic nucleus is fissioned or fused, is slowly converted into electric power. In this instance, various types of liquid metal reactors such as a pressurized water reactor (PWR), a heavy water reactor, a fast reactor, and the like are used to slowly generate a great amount of energy.

Currently, liquid metal reactors such as a sodium cooled fast reactor (SFR) using liquid metals and molten salts, for example, liquid sodium, as a coolant is mainly used. In this instance, liquid metals and molten salts are excellent in heat transfer and do not decelerate neutrons.

However, in a conventional art, nuclear reactor systems using liquid metals and molten salts have safety problems. In steam generators or heat exchangers of nuclear reactor systems using liquid metals and molten salts, cracks in heat pipes may occur due to corrosions or thermal imbalance. Such cracks cause serious damage to heat pipe tubes of steam generators or heat exchangers. Accordingly, such damage of heat pipe tubes results in shutdowns of steam generators in nuclear reactor systems using liquid metals and molten salts, heat exchangers in nuclear reactor systems using liquid metals and molten salts, or nuclear reactors.

Thus, a sensing method and system which may sense cracks early as described above is required.

BRIEF SUMMARY

The present invention provides a method and system for early sensing of water leakage, through chemical concentration monitoring, in a nuclear reactor system using a liquid metal and molten salt which sense water leakage (steam leakage), due to a crack in a steam generator or a heat exchanger included in the nuclear reactor system using the liquid metal and molten salt, early and thereby may help the steam generator or the heat exchanger to control the water leakage (steam leakage).

The present invention also provides a method and system for early sensing of water leakage, through chemical concentration monitoring, in a nuclear reactor system using a liquid metal and molten salt which sense water leakage (steam leakage), due to a crack in a steam generator or a heat exchanger included in the nuclear reactor system using the liquid metal and molten salt, early and thereby may prevent a shutdown of nuclear reactor.

The present invention also provides a method and system for early sensing of water leakage, through chemical concentration monitoring, in a nuclear reactor system using a liquid metal and molten salt which sense water leakage (steam leakage), due to a crack in a steam generator or a heat exchanger included in the nuclear reactor system using the liquid metal and molten salt, early and thereby may prevent a shutdown of the steam generator or the heat exchanger included in the nuclear reactor system using the liquid metal and molten salt.

According to an aspect of the present invention, there is provided a method of early sensing of water leakage, through chemical concentration monitoring, in a nuclear reactor system using a liquid metal and molten salt, the method including: measuring an electrical conductivity of a first channel and a second channel of a heat-related device included in the nuclear reactor system using the liquid metal and the molten salt; calculating an identification value associated with the water leakage in the heat-related device using the measured electrical conductivity; and sensing the water leakage by comparing the calculated identification value and a predetermined reference value.

In the present invention, the heat-related device may indicate a steam generator or a heat exchanger included in the nuclear reactor using the liquid metal and the molten salt, for example, a liquid metal reactor, a sodium cooled fast reactor, a nuclear transmutation, and the like. In the present specification, the steam generator or the heat exchanger included in the nuclear reactor using the liquid metal and the molten salt is described as an example of the heat-related device for convenience of description. The nuclear reactor using the liquid metal and the molten salt may cover all types of reactors using the liquid metal and the molten salt as a coolant, and may include a fast reactor, a nuclear transmutation, and the like. For example, the nuclear reactor may include a liquid metal reactor, a sodium cooled fast reactor, a nuclear transmutation, a pressurized water reactor, a heavy water reactor, and the like.

The heat exchanger uses two types of heating media. In the heat exchanger, water (steam) may be used in a tube side, and the liquid metal and molten salt such as sodium may be used in a shell side. Conversely, in the heat exchanger, the water (steam) may be used in the shell side, and the liquid metal and molten salt such as the sodium may be used in the tube side.

According to another aspect of the present invention, there is provided a method of early sensing of water leakage, through chemical concentration monitoring, in a nuclear reactor system using a liquid metal and molten salt, the method including: measuring a mass spectrum of a first channel and a second channel of a heat-related device included in the nuclear reactor system using the liquid metal and the molten salt; calculating an identification value associated with the water leakage in the heat-related device using the measured mass spectrum; and sensing the water leakage by comparing the calculated identification value and a predetermined reference value.

According to still another aspect of the present invention, there is provided a method of early sensing of water leakage, through chemical concentration monitoring, in a nuclear reactor system using a liquid metal and molten salt, the method including: measuring an electrical conductivity and a mass spectrum of a first channel and a second channel of a heat-related device included in the nuclear reactor system using the liquid metal and the molten salt; calculating a first identification value associated with the water leakage in the heat-related device using the measured electrical conductivity; calculating a second identification value associated with the water leakage in the heat-related device using the measured mass spectrum; and sensing the water leakage by comparing a predetermined reference value and a summed identification value, the summed identification value being the sum of the first identification value and the second identification value.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
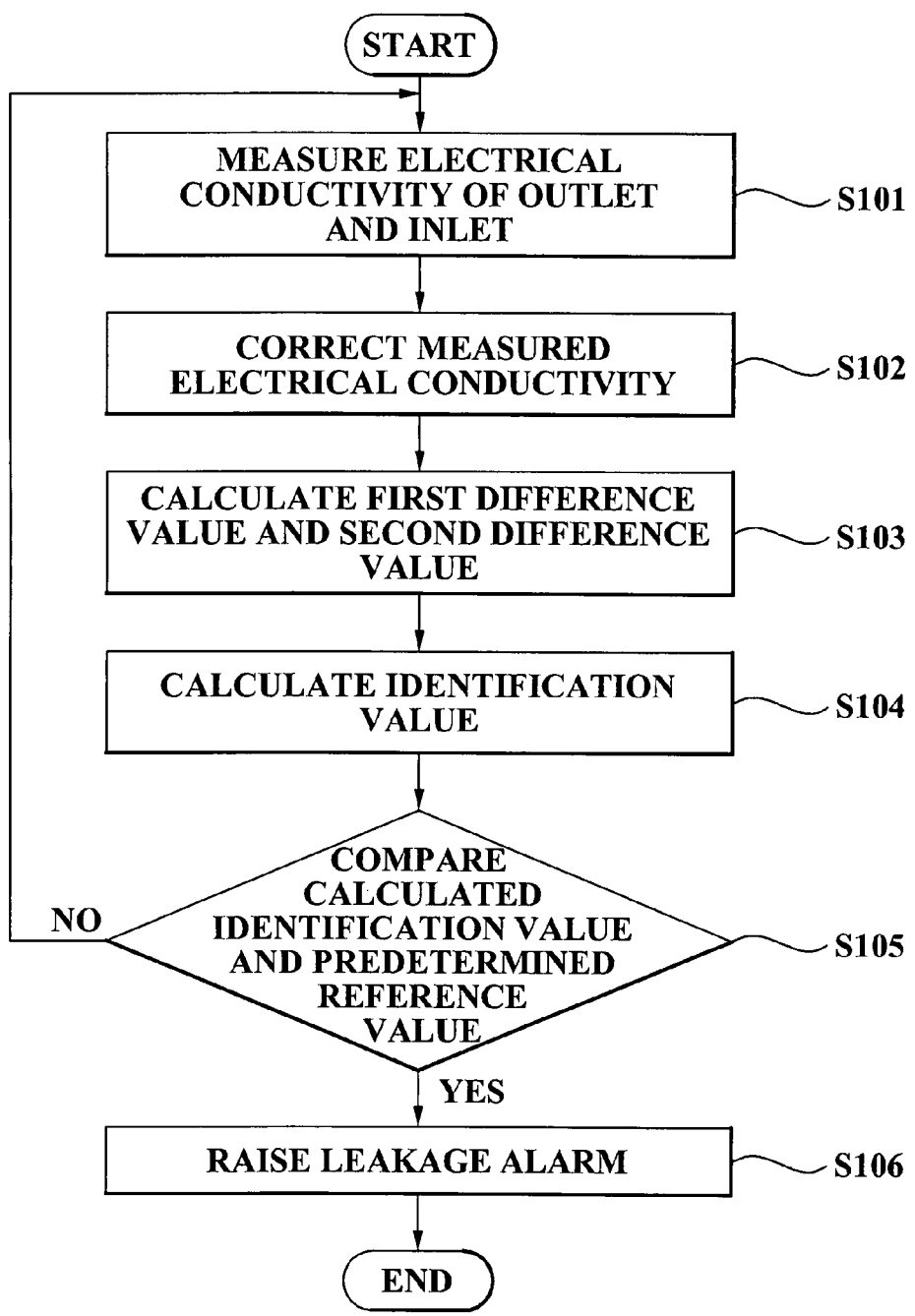
FIG. 1 is a flowchart illustrating a method of early sensing of water leakage, through chemical concentration monitoring, in a nuclear reactor system using a liquid metal and molten salt according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method of early sensing of water leakage, through chemical concentration monitoring, in a nuclear reactor system using a liquid metal and molten salt according to an embodiment of the present invention.

In operation S101, a system for early sensing of water leakage according to the present invention measures an electrical conductivity of a first channel and a second channel of a steam generator or a heat exchanger included in the nuclear reactor system using the liquid metal and the molten salt. Specifically, in operation S101, the electrical conductivity of each of the first channel and the second channel is measured using an electrical conductivity sensor. The first channel includes outlet 1 and outlet 2 of the steam generator or the heat exchanger. Also, the second channel includes an inlet of the steam generator or the heat exchanger.

Although it is described that the first channel includes two outlets, that is, the outlet 1 and the outlet 2, and the second channel includes one inlet in the present specification, a number of outlets or a number of inlets, included in the first channel and the second channel, respectively, may vary considering a system environment.

Here, the measured electrical conductivity may be different in the inlet and the outlet of the steam generator or the heat exchanger depending on a chemical reaction of sodium and water, since development of sodium oxide occurs due to the chemical reaction of sodium and water when the sodium penetrates into the water (steam) at an early stage of a crack generation in a heat pipe of the steam generator or the heat exchanger. The sodium oxide generated by the chemical reaction fills the crack at the early stage of the crack generation. Then, the sodium oxide in the crack contacts with the water (steam) and dissolves in the water (steam). Also, after the crack occurs, the crack gradually grows, and the sodium oxide penetrates into the water (steam) along a wall of the crack. Also, concentrations of chemicals increase due to the dissolving of the sodium oxide in the water (steam), and thus an electrical conductivity and a mass spectrum increase. That is, the system for early sensing of water leakage measures the electrical conductivity of the outlet 1, the outlet 2, and the inlet to determine whether the crack of the steam generator or the heat exchanger occurs. Accordingly, the system for early sensing of water leakage may ascertain whether the sodium into the crack reacting with the water (steam) in the steam generator or the heat exchanger is penetrated.

The steam generator or the heat exchanger may include an m number of outlets or an n number of inlets. In this instance, each of the m and the n is a natural number greater than 1. Although it is described that the two outlets and one inlet are included in the steam generator or the heat exchanger in the present specification, it will be apparent to those skilled in the related arts the present invention is not limited to the above-described embodiment.

Also, the electrical conductivity may be replaced with a acidity (pH). The pH may be different in the inlet and the outlet due to the chemical reaction of the water (steam) and the sodium.

In operation S102, the system for early sensing of water leakage performs a dilution correction or a temperature compensation with respect to the measured electrical conductivity. In operation S102, the dilution correction or the temperature compensation with respect to the measured electrical conductivity is performed considering a fact that the measured electrical conductivity is affected by a temperature and a dilution of the sodium when measured. Specifically, the system for early sensing of water leakage may correct the measured electrical conductivity to be consistent with a standard temperature or a standard dilution. Here, the standard temperature or the standard dilution is used as a standard for determining whether the water leaks.

As an example of correcting the measured electrical conductivity, the standard temperature is set to '15 degrees Celsius' and the standard dilution is set to '4%'. It is assumed that the measured electrical conductivity is required to be corrected to be within '±1S', when a temperature when measuring the electrical conductivity is different from the standard temperature by '±1 degree'. Also, it is assumed that the measured electrical conductivity is required to be corrected to be within '±1S', when a dilution when measuring the electrical conductivity is different from the standard dilution by '±1%'.

When the temperature when measuring the electrical conductivity is '10 degrees Celsius' and the dilution when measuring the electrical conductivity is '3%', the system for early sensing of water leakage may correct the measured electrical conductivity to be consistent with the standard temperature or the standard dilution. Specifically, when the measured electrical conductivity is '15S', a corrected electrical conductivity is '9S' (9=15−5−1) according to the standard temperature '15 degrees Celsius' and the standard dilution '4%'.

In operation S103, the system for early sensing of water leakage calculates a first difference value between an electrical conductivity of the outlet 1 and an electrical conductivity of the inlet, and calculates a second difference value between an electrical conductivity of the outlet 2 and the electrical conductivity of the inlet. In operation S1103, a difference between the electrical conductivity of each of the outlet 1, the outlet 2, and the inlet is ascertained using the measured electrical conductivity.

Specifically, the system for early sensing of water leakage may calculate the difference between the electrical conductivity of the inlet and the electrical conductivity of the outlet 1 or the outlet 2. In this instance, the electrical conductivity is different depending on the chemical reaction of sodium and water. Accordingly, the system for early sensing of water leakage may determine whether the water (steam) leaks based on the difference. Here, the system for early sensing of water leakage may calculate the first difference value and the second difference value using a Wheatstone Bridge circuit.

As an example of calculating of the first difference value and the second difference value, it is assumed that the electrical conductivity of the inlet is '10S', the electrical conductivity of the outlet 1 is '15S', and the electrical conductivity of the outlet 2 is '20S'. A first difference value '5' (5=15−10) is obtained by subtracting the electrical conductivity of the inlet from the electrical conductivity of the outlet 1. A second difference value '10' (10=20−10) is obtained by subtracting the electrical conductivity of the inlet from the electrical conductivity of the outlet 2.

In operation S104, the system for early sensing of water leakage calculates an identification value by summing comparison values. In this instance, the comparison values are outputted by comparing a predetermined threshold value and each of the calculated first difference value and the calculated second difference value. In operation S104, the identification value, which may be compared to the predetermined reference value, that is, a standard for determining whether water leaks due to the crack, is calculated.

As an example of calculating the identification value, it is assumed that the first difference value is '2', the second difference value is '12', and the threshold value is '5'. Here, when the first difference value or the second difference value is greater than the threshold value, the comparison values may correspond to the first difference value or the second difference value, or a logical value '1'. Also, when the first difference value or the second difference value is less than or equal to the threshold value, the comparison values may be '0' or a logical value '0'.

Since the first difference value is '2' and the threshold value is '5', a first comparison value, that is, a comparison result of the first difference value and the threshold value, is '0' or the logical value '0'. Also, since the second difference value is '12' and the threshold value is '5', a second comparison value, that is, a comparison result of the second difference value and the threshold value, is '12', that is, the second difference value, or the logical value '1'. Then, the system for early sensing of water leakage sums the first comparison value and the second comparison value, and thereby may calculate the identification value, that is, '12' (12=0+12) or the logical value '1' (1=1+0).

In operation S105, the system for early sensing of water leakage senses water leakage by comparing the calculated identification value and a predetermined reference value. In operation S105, the system for early sensing of water leakage senses whether the water leaks by comparing the calculated identification value with the predetermined reference value which is a standard for determination with respect to whether the water leaks in the steam generator or the heat exchanger.

Specifically, the system for early sensing of water leakage may determine whether the water leaks by comparing the predetermined reference value and the identification value calculated using the measured electrical conductivity. When the identification value is greater than the reference value, that is, 'yes' direction in FIG. 1, the system for early sensing of water leakage determines the water leaks, outputs the logical value '1', and may perform a subsequent operation. Conversely, when the identification value is less than or equal to the reference value, that is, 'no' direction in FIG. 1, the system for early sensing of water leakage outputs the logical value '0' and determines the water does not leak.

As an example of comparing the identification value and the reference value, it is assumed that the identification value is '12' and the reference value is '10'. Since the identification value is greater than the reference value, the system for early sensing of water leakage may determine the water leaks in the steam generator or the heat exchanger, and output the logical value '1'. Conversely, when the identification value is '9' and the reference value is '10', since the identification value is less than or equal to the reference value, the system for early sensing of water leakage may determine the water does not leak in the steam generator or the heat exchanger, and output the logical value '0'.

As another example of comparing the identification value and the reference value, it is assumed that the identification value is logical value '1' and the reference value is the same as the logical value '0'. Since the identification value is greater than the reference value, the system for early sensing of water leakage may determine the water leaks in the steam generator or the heat exchanger, and output the logical value '1'. Conversely, when the identification value is the same as the logical value '0' and the reference value is the same as the logical value '0', since the identification value is identical to the reference value, the system for early sensing of water leakage may determine the water does not leak in the steam generator or the heat exchanger, and output the logical value '0'.

In operation S106, when the water leakage is sensed in the steam generator or the heat exchanger, the system for early sensing of water leakage raises a leakage alarm. In operation S106, when the water leakage in the steam generator or the heat exchanger is sensed, that is, the logical value '1' is outputted in operation S105, the system for early sensing of water leakage reports the leakage to a person in charge of operating the system for early sensing of water leakage.

Specifically, the system for early sensing of water leakage may inform the person of the situation using light, sound, video, characters, and the like.

Figure 2:
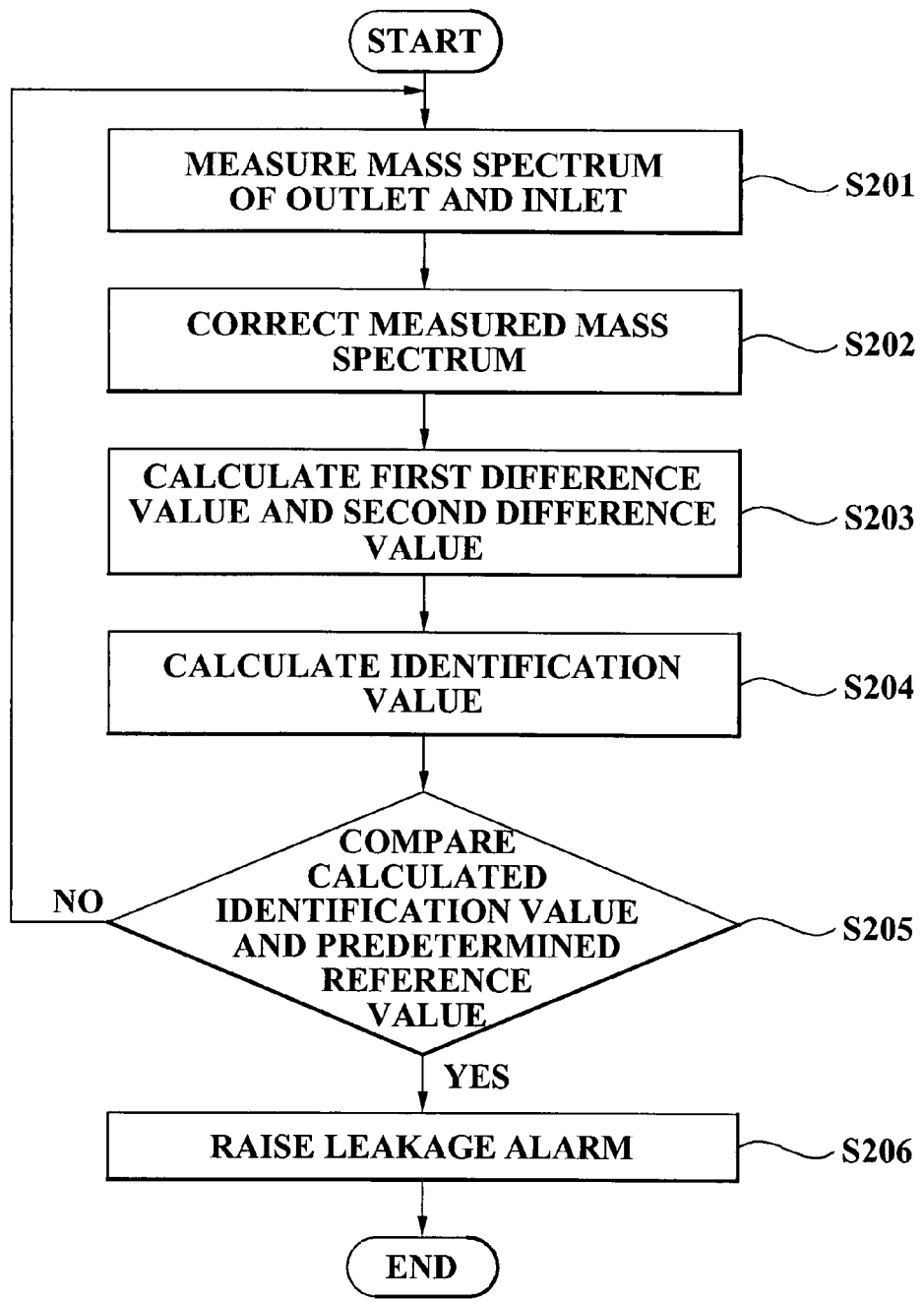
FIG. 2 is a flowchart illustrating a method of early sensing of water leakage, through chemical concentration monitoring, in a nuclear reactor system using a liquid metal and molten salt according to another embodiment of the present invention.

FIG. 2 is a flowchart illustrating a method of early sensing of water leakage, through chemical concentration monitoring, in a nuclear reactor system using a liquid metal and molten salt according to another embodiment of the present invention.

As illustrated in FIG. 2, a system for early sensing of water leakage according to the other embodiment of the present invention measures a mass spectrum instead of an electrical conductivity. For this, the system for early sensing of water leakage uses a sampling port which measures the mass spectrum, instead of an electrical conductivity sensor which measures the electrical conductivity, of an inlet, an outlet 1, or an outlet 2 of a steam generator or a heat exchanger.

When comparing the method of early sensing of water leakage according to the other embodiment of the present invention, that is, a mass spectrum measurement, with a method of early sensing of water leakage according to an embodiment of the present invention, that is, an electrical conductivity measurement, only methods used for measuring and objects of measurement are different. Thus, operations S201, S202, S203, S204, and S205 are analogous to operations S101, S102, S103, S104, and S105, respectively. in the related arts may fully understand the method of early sensing of water leakage according to the other embodiment of the present invention, that is, the mass spectrum measurement, based on the method of early sensing of water leakage according to the above embodiment of the present invention, that is, the electrical conductivity measurement. Thus, a more detailed description is omitted.

Figure 3:
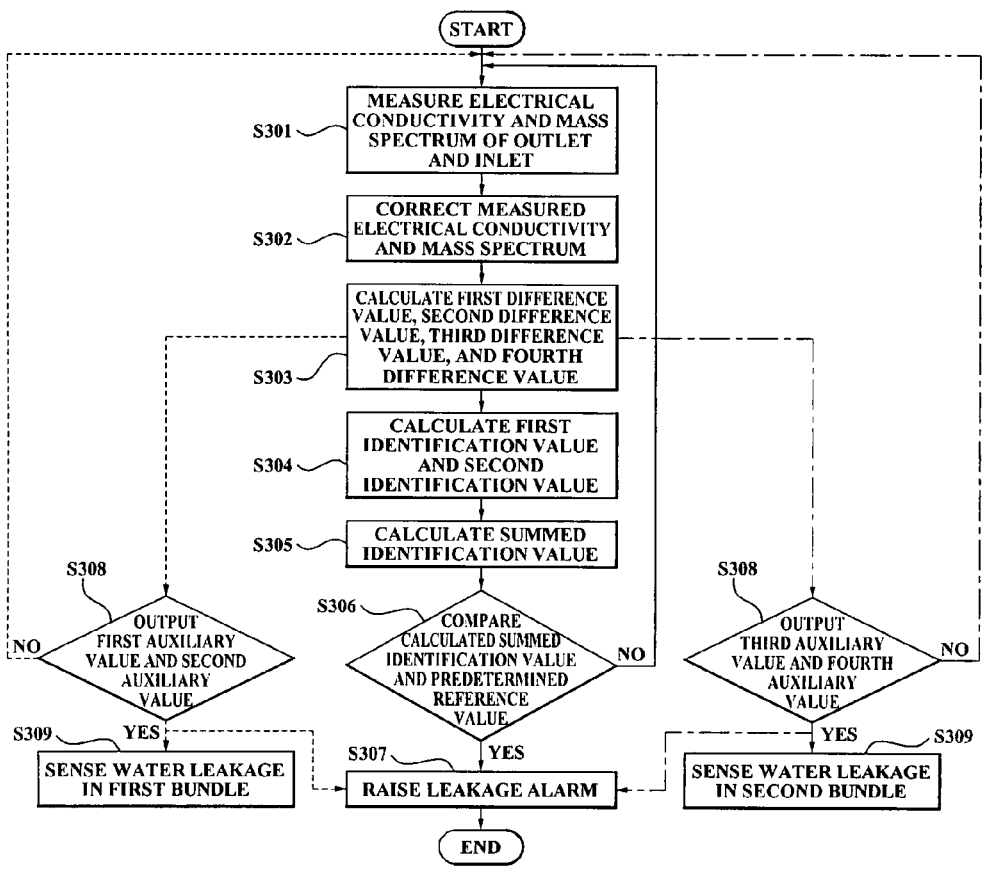
FIG. 3 is a flowchart illustrating a method of early sensing of water leakage, through chemical concentration monitoring, in a nuclear reactor system using a liquid metal and molten salt according to still another embodiment of the present invention.

FIG. 3 is a flowchart illustrating a method of early sensing of water leakage, through chemical concentration monitoring, in a nuclear reactor system using a liquid metal and molten salt according to still another embodiment of the present invention.

In operation S301, a system for early sensing of water leakage measures an electrical conductivity and a mass spectrum of a first channel and a second channel of a steam generator or a heat exchanger included in the nuclear reactor system using the liquid metal and the molten salt. Specifically, the electrical conductivity and the mass spectrum each of the first channel and the second channel of the steam generator or the heat exchanger are measured. The first channel includes an outlet 1 and an outlet 2 of the steam generator or the heat exchanger, and the second channel includes an inlet of the steam generator or the heat exchanger. Accordingly, the system for early sensing of water leakage may measure the electrical conductivity and the mass spectrum of each of the outlet 1, the outlet 2, and the inlet of the steam generator or the heat exchanger.

In operation S302, the system for early sensing of water leakage performs a dilution correction or a temperature compensation with respect to the measured electrical conductivity or mass spectrum. In operation S302, the dilution correction or the temperature compensation with respect to the measured electrical conductivity or mass spectrum is performed considering a fact that the measured electrical conductivity or mass spectrum is affected by a temperature and a dilution of sodium when measured. Specifically, the system for early sensing of water leakage may correct the measured electrical conductivity or mass spectrum to be consistent with a standard temperature or a standard dilution. Here, the standard temperature or the standard dilution is used to determine whether water leaks.

As an example of correcting the measured electrical conductivity or mass spectrum, when measuring the electrical conductivity or mass spectrum, the standard temperature is set to '15 degrees Celsius' and the standard dilution is set to '4%'. It is assumed that the measured electrical conductivity is required to be corrected to be within '±1S', when a temperature when measuring the electrical conductivity is different from the standard temperature by '±1 degree'. Also, it is assumed that the measured electrical conductivity is required to be corrected to be within '±1S', when a dilution when measuring the electrical conductivity is different from the standard dilution by '±1%'. Also, it is assumed that a correction method with respect to the mass spectrum is performed in the same way as the electrical conductivity.

As an example, when the temperature when measuring the electrical conductivity or mass spectrum is '10 degrees Celsius' and the dilution when measuring the electrical conductivity or mass spectrum is '3%', the system for early sensing of water leakage may assume a measurement environment described above to be different from the standard temperature and the standard dilution, and correct the measured electrical conductivity or mass spectrum to be consistent with the standard temperature and the standard dilution. Specifically, when the measured electrical conductivity is '15S', a corrected electrical conductivity is '9S' (9=15-5-1) according to the standard temperature '15 degrees Celsius' and the standard dilution '4%'. Also, when the measured mass spectrum is '14', a corrected mass spectrum is '8' (8=14-5-1) according to the standard temperature '15 degrees Celsius' and the standard dilution '4%'.

In operation S303, the system for early sensing of water leakage calculates a first difference value between the electrical conductivity of the outlet 1 and the electrical conductivity of the inlet, and calculates a second difference value between the electrical conductivity of the outlet 2 and the electrical conductivity of the inlet. Also, the system for early sensing of water leakage calculates a third difference value between the mass spectrum of the outlet 1 and the mass spectrum of the inlet, and calculates a fourth difference value between the mass spectrum of the outlet 2 and the mass spectrum of the inlet. In operation S303, a difference between the electrical conductivity and the mass spectrum of each of the outlet 1, the outlet 2, and the inlet is ascertained using the measured electrical conductivity and mass spectrum.

Specifically, the system for early sensing of water leakage may calculate the difference between the electrical conductivity and the mass spectrum of the inlet and the electrical conductivity and the mass spectrum of the outlet 1 and the outlet 2, depending on a chemical reaction of sodium and water. Accordingly, the system for early sensing of water leakage may determine how significant a crack is based on the difference. Here, the system for early sensing of water leakage may calculate the first difference value, the second difference value, the third difference value, and the fourth difference value using a Wheatstone Bridge circuit.

As an example of calculating of the first difference value, the second difference value, the third difference value, and the fourth difference value, it is assumed that the electrical conductivity of the inlet is '10S', the electrical conductivity of the outlet 1 is '15S', and the electrical conductivity of the outlet 2 is '20S'. Also, it is assumed that the mass spectrum of the inlet is '10', the mass spectrum of the outlet 1 is '15', and the mass spectrum of the outlet 2 is '20'.

Here, a first difference value '5' (5=15−10) is obtained by subtracting the electrical conductivity of the inlet from the electrical conductivity of the outlet 1. A second difference value '10' (10=20−10) is obtained by subtracting the electrical conductivity of the inlet from the electrical conductivity of the outlet 2.

Also, a third difference value '5' (5=15-10) is obtained by subtracting the mass spectrum of the inlet from the mass spectrum of the outlet 1. A fourth difference value '10' (10=20−10) is obtained by subtracting the mass spectrum of the inlet from the mass spectrum of the outlet 2.

In operation S304, the system for early sensing of water leakage calculates a first identification value by summing comparison values. In this instance, the comparison values are outputted by comparing a predetermined first threshold value and each of the calculated first difference value and the calculated second difference value. That is, in operation S304, the first difference value is calculated to obtain a numerical value, that is, a summed identification value. The summed identification value may be compared to the predetermined reference value, that is, a standard for determining whether the water leaks due to the crack. Specifically, the system for early sensing of water leakage may output the comparison values, and sum the comparison values in order to obtain the first identification value. The comparison values are obtained by comparing the first threshold value with each of the first difference value and the second difference value.

As an example of calculating the identification value, it is assumed that the first difference value is '2', the second difference value is '12', and the first threshold value is '5'. Here, when the first difference value or the second difference value is greater than the threshold value, the comparison values may be the first difference value or the second difference value, or a logical value '1'. Conversely, when the first difference value or the second difference value is less than or equal to the threshold value, the comparison value may be '0' or a logical value '0'.

Since the first difference value is '2' and the threshold value is '5', a first comparison value, that is, a comparison result of the first difference value and the threshold value, is '0' or the logical value '0'. Also, since the second difference value is '12' and the threshold value is '5', a second comparison value, that is, a comparison result of the second difference value and the threshold value, is '12' or the logical value '1'. Then, the system for early sensing of water leakage sums the first comparison value and the second comparison value, and thereby may calculate the first identification value, that is, '12' (12=0+12) or the logical value '1' (1=1+0).

Also, in operation S304, a second identification value is calculated. In this instance, each of the third difference value and the fourth difference value are compared to a predetermined second threshold value, and thus comparison values are outputted. The comparison values are summed, and thus the second identification value is obtained. Since a method of calculating the second identification value is the same as the method of calculating the first identification value, a description of the method of calculating of the second identification value is omitted.

In operation S305, the system for early sensing of water leakage calculates the summed identification value by summing the first identification value and the second identification value. In operation S305, the summed identification value which may be compared to the predetermined reference value, that is, the standard for determining whether the water leaks due to the crack.

In operation S306, the system for early sensing of water leakage senses water leakage by comparing the calculated summed identification value and the predetermined reference value. In operation S306, the system for early sensing of water leakage senses whether the water leaks by comparing the calculated summed identification value with the predetermined reference value which is the standard for determination with respect to whether the water leaks in the steam generator or the heat exchanger.

Specifically, the system for early sensing of water leakage may determine whether the water leaks by comparing the predetermined reference value and the summed identification value calculated using the measured electrical conductivity and mass spectrum. When the summed identification value is greater than the reference value, that is, 'yes' direction in operation S306, the system for early sensing of water leakage determines the water leaks, outputs the logical value '1', and may perform a subsequent operation. Conversely, when the summed identification value is less than or equal to the reference value, that is, 'no' direction in operation S306, the system for early sensing of water leakage determines the water does not leak and outputs the logical value '0'.

As an example of comparing the summed identification value and the reference value, it is assumed that the summed identification value is '12' and the reference value is '10'. Since the summed identification value is greater than the reference value, the system for early sensing of water leakage may determine the water leaks in the steam generator or the heat exchanger, and output the logical value '1'. Conversely, when the summed identification value is '9' and the reference value is '10', the system for early sensing of water leakage may determine the water does not leak in the steam generator or the heat exchanger, and output the logical value '0', since the summed identification value is less than or equal to the reference value.

As another example of comparing the summed identification value and the reference value, it is assumed that the summed identification value is the same as the logical value '1' and the reference value is the same as the logical value '0'. Since the summed identification value is greater than the reference value, the system for early sensing of water leakage may determine the water leaks in the steam generator or the heat exchanger, and output the logical value '1'. Conversely, when the summed identification value is the same as the logical value '0' and the reference value is the same as the logical value '0', since the summed identification value is identical to the reference value, the system for early sensing of water leakage may determine the water does not leak in the steam generator or the heat exchanger, and output the logical value '0'.

In operation S307, when the water leakage is sensed in the steam generator or the heat exchanger, the system for early sensing of water leakage raises a leakage alarm. In operation S307, when the water leakage in the steam generator or the heat exchanger is sensed, that is, the logical value '1' is outputted in operation S306, the system for early sensing of water leakage reports the leakage to a person in charge of operating the system for early sensing of water leakage.

Specifically, the system for early sensing of water leakage may inform the person of the situation using light, sound, video, characters, and the like.

In operation S308, the system for early sensing of water leakage outputs a first auxiliary value by comparing the first threshold value and a difference value between the electrical conductivity of the outlet 1 included in the first channel and the electrical conductivity of the inlet included in the second channel. Also, the system for early sensing of water leakage outputs a second auxiliary value by comparing the second threshold value and a difference value between the mass spectrum of the outlet 1 and the mass spectrum of the inlet.

Also, the system for early sensing of water leakage outputs a third auxiliary value by comparing a third threshold value and a difference value between the electrical conductivity of the outlet 2 included in the first channel and the electrical conductivity of the inlet included in the second channel. Also, the system for early sensing of water leakage outputs a fourth auxiliary value by comparing a fourth threshold value and a difference value between the mass spectrum of the outlet 2 and the mass spectrum of the inlet.

In operation S308, the first auxiliary value, the second auxiliary value, the third auxiliary value, and the fourth auxiliary value are outputted to determine whether the water leaks in a first bundle or a second bundle of the steam generator or the heat exchanger, using the measured electrical conductivity and mass spectrum.

In operation S309, the system for early sensing of water leakage senses water leakage in the first bundle of the steam generator or the heat exchanger using the outputted first auxiliary value and second auxiliary value. Also, the system for early sensing of water leakage senses water leakage in the second bundle of the steam generator or the heat exchanger using the outputted third auxiliary value and fourth auxiliary value. In operation S309, the water leakage is sensed by dividing the steam generator or the heat exchanger into the first bundle and the second bundle.

As an example of sensing the water leakage in the first bundle and the second bundle, when the first auxiliary value, for example, 11, is greater than the predetermined threshold value, for example, 10, or the second auxiliary value, for example, 15, is greater than another predetermined threshold value, for example, 13, the system for early sensing of water leakage may determine the water leaks in the first bundle. Also, when the third auxiliary value, for example, 11, is greater than the predetermined threshold value, for example, 10, or the fourth auxiliary value, for example, 15, is greater than the other predetermined threshold value, for example, 13, the system for early sensing of water leakage may determine the water leaks in the second bundle.

Specifically, the system for early sensing of water leakage may accurately sense the water leakage occurs in the steam generator or the heat exchanger.

For example, the system for early sensing of water leakage may accurately sense the water leakage occurs by dividing the steam generator or the heat exchanger into an N number of bundles. In this instance, N is a natural number.

Figure 4:
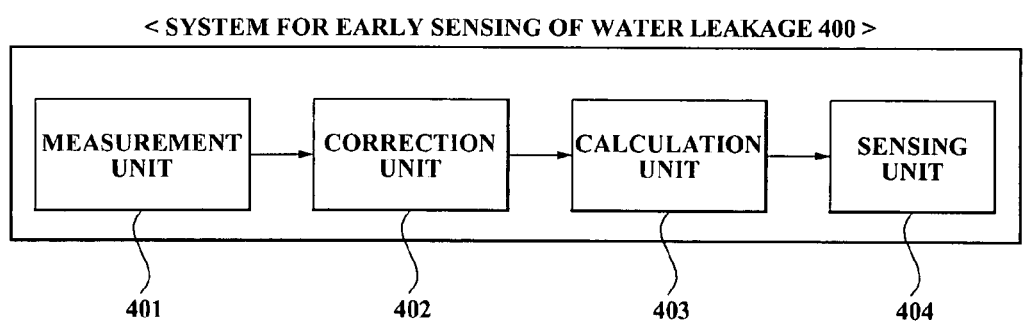
FIG. 4 is a block diagram illustrating a configuration of a system for early sensing of water leakage, through chemical concentration monitoring, in a nuclear reactor system using a liquid metal and molten salt according to an embodiment of the present invention.

FIG. 4 is a block diagram illustrating a configuration of a system for early sensing of water leakage, through chemical concentration monitoring, in a nuclear reactor system using a liquid metal and molten salt according to an embodiment of the present invention.

A measurement unit 401 measures an electrical conductivity or a mass spectrum of a first channel and a second channel of a steam generator or a heat exchanger. The steam generator or the heat exchanger is included in the nuclear reactor system using the liquid metal and the molten salt. The measurement unit 401 may measure the electrical conductivity or the mass spectrum of the first channel including an outlet 1 and an outlet 2 of the steam generator or the heat exchanger. Also, the measurement unit 401 may measure the electrical conductivity or the mass spectrum of the second channel including an inlet of the steam generator or the heat exchanger.

A correction unit 402 performs a dilution correction or a temperature compensation with respect to the measured electrical conductivity or mass spectrum. In the correction unit 402, the dilution correction or the temperature compensation with respect to the measured electrical conductivity is performed considering a fact that the measured electrical conductivity is affected by a temperature and a dilution of the sodium when measured. Specifically, the correction unit 402 may correct the measured electrical conductivity according to a standard temperature or a standard dilution.

As an example of correcting the measured electrical conductivity, when measuring the electrical conductivity, the standard temperature is set to '15 degrees Celsius' and the standard dilution is set to '4%'. It is assumed that the measured electrical conductivity is required to be corrected to be within '±1S', when a temperature when measuring the electrical conductivity is different from the standard temperature by '±1 degree'. Also, it is assumed that the measured electrical conductivity is required to be corrected to be within '±1S', when a dilution when measuring the electrical conductivity is different from the standard dilution by '±1%'.

It is apparent that the measured mass spectrum is corrected in the same way as the measured electrical conductivity.

When the temperature when measuring the electrical conductivity is '10 degrees Celsius' and the dilution when measuring the electrical conductivity is '3%', the correction unit 402 may consider a measurement environment to be different from the standard temperature or the standard dilution, and correct the measured electrical conductivity to be consistent with the standard temperature and the standard dilution. Specifically, when the measured electrical conductivity is '15S', a corrected electrical conductivity becomes '9' (9=15−5−1) according to the standard temperature '15 degrees Celsius' and the standard dilution '4%'.

A calculation unit 403 calculates a first difference value between an electrical conductivity or a mass spectrum of the outlet 1 and an electrical conductivity or a mass spectrum of the inlet. Also, the calculation unit 403 calculates a second difference value between an electrical conductivity or a mass spectrum of the outlet 2 and the electrical conductivity or the mass spectrum of the inlet.

Specifically, the calculation unit 403 may calculate a difference between the electrical conductivity or the mass spectrum of the inlet and the electrical conductivity or the mass spectrum of the outlet 1 and the outlet 2 based on a chemical reaction of sodium and water (steam). Accordingly, the calculation unit 403 may determine how significant a crack is based on the difference.

Components included in the calculation unit 403 are described in detail with reference to FIG. 5.

Figure 5:
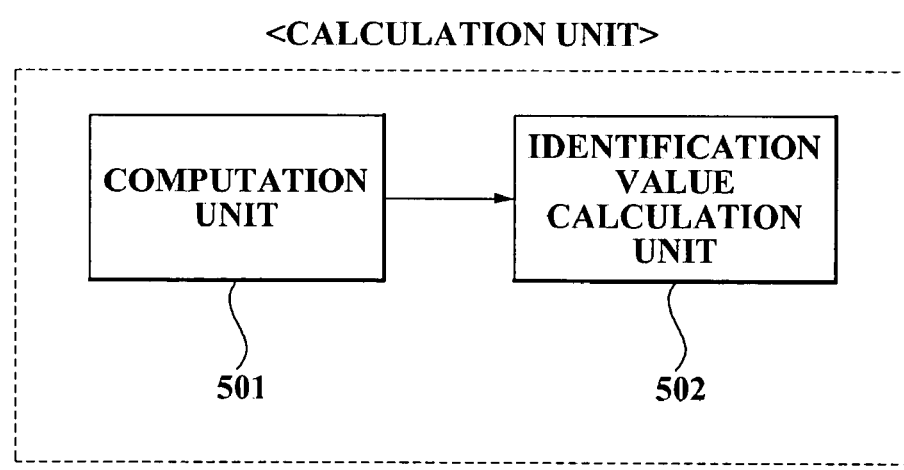
FIG. 5 is a block diagram illustrating a configuration of a calculation unit of FIG. 4 in detail.

FIG. 5 is a block diagram illustrating a configuration of the calculation unit 403 of FIG. 4 in detail.

As illustrated in FIG. 5, the calculation unit 403 may include a computation unit 501 and an identification value calculation unit 502.

As an example of calculating of the first difference value and the second difference value, it is assumed that the electrical conductivity or the mass spectrum of the inlet is '10', the electrical conductivity or the mass spectrum of the outlet 1 is '15', and the electrical conductivity or the mass spectrum of the outlet 2 is '20'. The computation unit 501 calculates the first difference value '5' (5=15−10) by subtracting the electrical conductivity or the mass spectrum of the inlet from the electrical conductivity or the mass spectrum of the outlet 1. The computation unit 501 calculates the second difference value '10' (10=20−10) by subtracting the electrical conductivity or the mass spectrum of the inlet from the electrical conductivity or the mass spectrum of the outlet 2.

The identification value calculation unit 502 calculates an identification value by summing comparison values. In this instance, the comparison values are outputted by comparing a predetermined threshold value and each of the calculated first difference value and the calculated second difference value. The identification value calculation unit 502 may calculate the identification value which may be compared to the predetermined reference value, that is, a standard for determining whether water leaks due to a crack. Specifically, the identification value calculation unit 502 may compare the predetermined threshold value with each of the calculated first difference value and the calculated second difference value, output the comparison values as a result of the comparing, and sum the comparison values.

As an example of calculating the identification value, it is assumed that the first difference value is '2', the second difference value is '12', and the threshold value is '5'. Here, when the first difference value or the second difference value is greater than the threshold value, the comparison value may be the first difference value or the second difference value, or a logical value '1'. Conversely, when the first difference value or the second difference value is less than or equal to the threshold value, the comparison value may be '0' or a logical value '0'.

Since the first difference value is '2' and the threshold value is '5', the identification value calculation unit 502 calculates a first comparison value '0' or the logical value '0'. The first comparison value is a comparison result of the first difference value and the threshold value. Also, since the second difference value is '12' and the threshold value is '5', the identification value calculation unit 502 calculates a second comparison value '12', that is, the second difference value, or the logical value '1'. The second comparison value is a comparison result of the second difference value and the threshold value. Then, the identification value calculation unit 502 sums the first comparison value and the second comparison value, and thereby may calculate the identification value, that is, '12' (12=0+12) or the logical value '1' (1=1+0).

The sensing unit 404 senses water leakage by comparing the calculated identification value and a predetermined reference value. The sensing unit 404 may sense whether the water leaks by comparing the calculated identification value with the predetermined reference value which is a standard for determination with respect to whether the water leaks in the steam generator or the heat exchanger.

Specifically, the sensing unit 404 may determine whether the water leaks by comparing the predetermined reference value and the identification value calculated using the measured electrical conductivity or the mass spectrum. When the identification value is greater than the reference value, the sensing unit 404 determines the water leaks, outputs the logical value '1', and may perform a subsequent operation. Conversely, when the identification value is less than or equal to the reference value, the sensing unit 404 determines the water does not leak and outputs the logical value '0'.

As an example of comparing the identification value and the reference value, it is assumed that the identification value is '12' and the reference value is '10'. Since the identification value is greater than the reference value, the sensing unit 404 may determine the water leaks in the steam generator or the heat exchanger, and output the logical value '1'. Conversely, when the identification value is '9' and the reference value is '10', since the identification value is less than or equal to the reference value, the sensing unit 404 may determine the water does not leak in the steam generator or the heat exchanger, and output the logical value '0'.

When sensing the water leakage in the steam generator or the heat exchanger, the sensing unit 404 raises a leakage alarm. When the water leakage in the steam generator or the heat exchanger is sensed, the sensing unit 404 reports the leakage to a person in charge of operating the system for early sensing of water leakage.

Specifically, the sensing unit 404 may inform the person of the situation using light, sound, video, characters, and the like.

Figure 6:
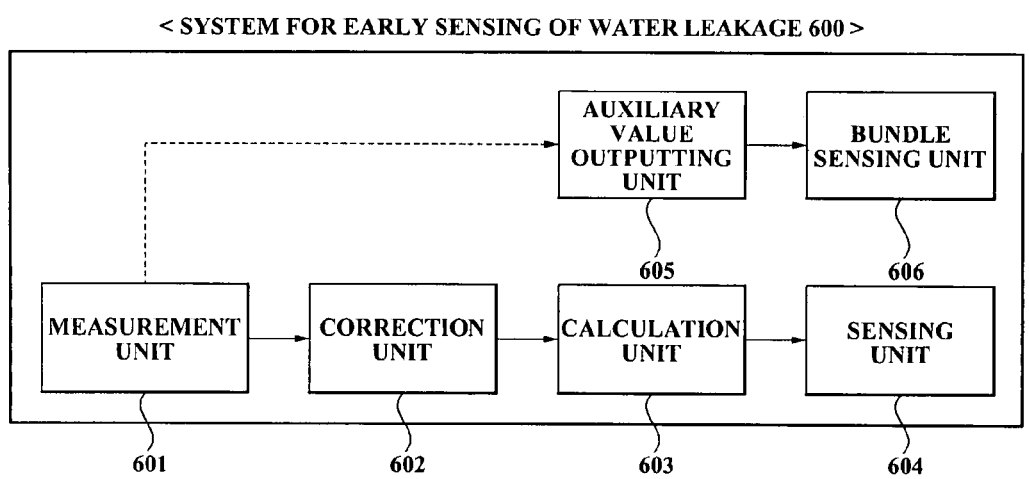
FIG. 6 is a block diagram illustrating a configuration of a system for early sensing of water leakage, through chemical concentration monitoring, in a nuclear reactor system using a liquid metal and molten salt according to still another embodiment of the present invention.

FIG. 6 is a block diagram illustrating a configuration of a system for early sensing of water leakage, through chemical concentration monitoring, in a nuclear reactor system using a liquid metal and molten salt according to still another embodiment of the present invention.

A measurement unit 601 measures an electrical conductivity and a mass spectrum of a first channel and a second channel of a steam generator or a heat exchanger included in the nuclear reactor system using the liquid metal and the molten salt. Specifically, the measurement unit 601 may measure the electrical conductivity and the mass spectrum of the first channel and the second channel of the steam generator or the heat exchanger. The first channel includes an outlet 1 and an outlet 2 of the steam generator or the heat exchanger, and the second channel includes an inlet of the steam generator or the heat exchanger. Accordingly, the system for early sensing of water leakage may measure the electrical conductivity and the mass spectrum of each of the outlet 1, the outlet 2, and the inlet of the steam generator or the heat exchanger to determine whether water leaks.

A correction unit 602 performs a dilution correction or a temperature compensation with respect to the measured electrical conductivity or mass spectrum. The correction unit 602 may perform the dilution correction or the temperature compensation with respect to the measured electrical conductivity or mass spectrum considering a fact that the measured electrical conductivity or mass spectrum is affected by a temperature and a dilution of sodium when measured. Specifically, the correction unit 602 may correct the measured electrical conductivity or mass spectrum according to a standard temperature or a standard dilution.

As an example of correcting the measured electrical conductivity or mass spectrum, when measuring the electrical conductivity or mass spectrum, the standard temperature is set to '15 degrees Celsius' and the standard dilution is set to '4%'. It is assumed that the measured electrical conductivity is required to be corrected to be within '±1S', when a temperature when measuring the electrical conductivity is different from the standard temperature by '±1 degree'. Also, it is assumed that the measured electrical conductivity is required to be corrected to be within '±1S', when a dilution when measuring the electrical conductivity is different from the standard dilution by '±1%'. Also, it is assumed that a correction method with respect to the mass spectrum is performed in the same way as the electrical conductivity.

When the temperature when measuring the electrical conductivity or mass spectrum is '10 degrees Celsius' and the dilution when measuring the electrical conductivity or mass spectrum is '3%', the correction unit 602 may consider a measurement environment described above to be different from the standard temperature and the standard dilution, and correct the measured electrical conductivity or mass spectrum to be consistent with the standard temperature or the standard dilution. Specifically, when the measured electrical conductivity is '15S', a corrected electrical conductivity is '9S' (9=15−5−1) according to the standard temperature '15 degrees Celsius' and the standard dilution '4%'. Also, when the measured mass spectrum is '14', a corrected mass spectrum is '8' (8=14−5−1) according to the standard temperature '15 degrees Celsius' and the standard dilution '4%'.

A calculation unit 603 calculates a first difference value between the electrical conductivity of the outlet 1 and the electrical conductivity of the inlet, and calculates a second difference value between the electrical conductivity of the outlet 2 and the electrical conductivity of the inlet. Also, the calculation unit 603 calculates a third difference value between the mass spectrum of the outlet 1 and the mass spectrum of the inlet, and calculates a fourth difference value between the mass spectrum of the outlet 2 and the mass spectrum of the inlet.

Specifically, the calculation unit 603 may calculate the difference between the electrical conductivity and the mass spectrum of the inlet and the electrical conductivity and the mass spectrum of the outlet 1 and the outlet 2, depending on a chemical reaction of sodium and water. Accordingly, the calculation unit 603 may determine how significant a crack is based on the difference.

As an example of calculating of the first difference value, the second difference value, the third difference value, and the fourth difference value, it is assumed that the electrical conductivity of the inlet is '10S', the electrical conductivity of the outlet 1 is '15S', and the electrical conductivity of the outlet 2 is '20S'. Also, it is assumed that the mass spectrum of the inlet is '10', the mass spectrum of the outlet 1 is '15', and the mass spectrum of the outlet 2 is '20'.

Here, a first difference value '5' (5=15−10) is obtained by subtracting the electrical conductivity of the inlet from the electrical conductivity of the outlet 1. A second difference value '10' (10=20−10) is obtained by subtracting the electrical conductivity of the inlet from the electrical conductivity of the outlet 2.

Also, a third difference value '5' (5=15−10) is obtained by subtracting the mass spectrum of the inlet from the mass spectrum of the outlet 1. A fourth difference value '10' (10=20−10) is obtained by subtracting the mass spectrum of the inlet from the mass spectrum of the outlet 2.

The calculation unit 603 calculates a first identification value by summing comparison values. In this instance, the comparison values are outputted by comparing a predetermined first threshold value and each of the calculated first difference value and the calculated second difference value. That is, the calculation unit 603 may calculate the first difference value to obtain a numeral value, that is, a summed identification value. The summed identification value may be compared to a predetermined reference value, that is, a standard for determining whether the water leaks due to the crack. Specifically, the calculation unit 603 may output the comparison values, and sum the comparison values in order to obtain the first identification value. The comparison values are obtained by comparing the first threshold value with each of the first difference value and the second difference value.

As an example of calculating the identification value, it is assumed that the first difference value is '2', the second difference value is '12', and the first threshold value is '5'. Here, when the first difference value or the second difference value is greater than the threshold value, the comparison value may be the first difference value, the second difference value, or a logical value '1'. Conversely, when the first difference value or the second difference value is less than or equal to the threshold value, the comparison value may be '0' or a logical value '0'.

Since the first difference value is '2' and the threshold value is '5', a first comparison value, that is, a comparison result of the first difference value and the threshold value, is '0' or the logical value '0'. Also, since the second difference value is '12' and the threshold value is '5', a second comparison value, that is, a comparison result of the second difference value and the threshold value, is '12' or the logical value '1'. Then, the calculation unit 603 sums the first comparison value and the second comparison value, and thereby may calculate the first identification value, that is, '12' (12=0+12) or the logical value '1' (1=1+0).

Also, the calculation unit 603 calculates a second identification value. In this instance, each of the third difference value and the fourth difference value are compared to a predetermined second threshold value, and thus comparison values are outputted. The comparison values are summed, and thus the second identification value is obtained. Since a method of calculating the second identification value is the same as the method of calculating the first identification value, a description of the method of calculating of the second identification value is omitted.

The calculation unit 603 calculates the summed identification value by summing the first identification value and the second identification value. The calculation unit 603 may calculate the summed identification value which may be compared to the predetermined reference value, that is, the standard for determining whether the water leaks due to the crack.

A sensing unit 604 senses water leakage by comparing the calculated summed identification value and the predetermined reference value. The sensing unit 604 may sense whether the water leaks by comparing the calculated summed identification value with the predetermined reference value which is a standard for determination with respect to whether the water leaks in the steam generator or the heat exchanger.

Specifically, the sensing unit 604 may determine whether the water leaks by comparing the predetermined reference value and the summed identification value calculated using the measured electrical conductivity and mass spectrum. When the summed identification value is greater than the reference value, the sensing unit 604 determines the water leaks, and outputs the logical value '1'. Conversely, when the summed identification value is less than or equal to the reference value, the sensing unit 604 determines the water does not leak and outputs the logical value '0'.

As an example of comparing the summed identification value and the reference value, it is assumed that the summed identification value is '12' and the reference value is '10'. Since the summed identification value is greater than the reference value, the sensing unit 604 may determine the water leaks in the steam generator or the heat exchanger, and output the logical value '1'. Conversely, when the summed identification value is '9' and the reference value is '10', the sensing unit 604 may determine the water does not leak in the steam generator or the heat exchanger, and output the logical value '0', since the summed identification value is less than or equal to the reference value.

As another example of comparing the summed identification value and the reference value, it is assumed that the summed identification value is the same as the logical value '1' and the reference value is the same as the logical value '0'. Since the summed identification value is greater than the reference value, the sensing unit 604 may determine the water leaks in the steam generator or the heat exchanger, and output the logical value '1'. Conversely, when the summed identification value is the same as the logical value '0' and the reference value is the same as the logical value '0', since the summed identification value is identical to the reference value, the sensing unit 604 may determine the water does not leak in the steam generator or the heat exchanger, and output the logical value '0'.

When the water leakage is sensed in the steam generator or the heat exchanger, the sensing unit 604 raises a leakage alarm. When the water leakage in the steam generator or the heat exchanger is sensed, the sensing unit 604 reports the leakage to a person in charge of managing the system for early sensing of water leakage.

Specifically, the sensing unit 604 may inform the person of the situation using light, sound, video, characters, and the like.

An auxiliary value outputting unit 605 outputs a first auxiliary value by comparing the first threshold value and a difference value between the electrical conductivity of the outlet 1 included in the first channel and the electrical conductivity of the inlet included in the second channel. Also, the auxiliary value outputting unit 605 outputs a second auxiliary value by comparing the second threshold value and a difference value between the mass spectrum of the outlet 1 and the mass spectrum of the inlet.

Also, the auxiliary value outputting unit 605 outputs a third auxiliary value by comparing a third threshold value and a difference value between the electrical conductivity of the outlet 2 included in the first channel and the electrical conductivity of the inlet included in the second channel. Also, the auxiliary value outputting unit 605 outputs a fourth auxiliary value by comparing a fourth threshold value and a difference value between the mass spectrum of the outlet 2 and the mass spectrum of the inlet.

Specifically, the auxiliary value outputting unit 605 may output the first auxiliary value, the second auxiliary value, the third auxiliary value, and the fourth auxiliary value to determine whether the water leaks in a first bundle or a second bundle of the steam generator or the heat exchanger, using the measured electrical conductivity and mass spectrum.

A bundle sensing unit 606 senses the water leakage in the first bundle of the steam generator or the heat exchanger using the outputted first auxiliary value and second auxiliary value. Also, the bundle sensing unit 606 senses the water leakage in the second bundle of the steam generator or the heat exchanger using the outputted third auxiliary value and fourth auxiliary value. The bundle sensing unit 606 may sense the water leakage by dividing the steam generator or the heat exchanger into the first bundle and the second bundle.

As an example of sensing the water leakage in the first bundle and the second bundle, when the first auxiliary value, for example, 11, is greater than the predetermined threshold value, for example, 10, or the second auxiliary value, for example, 15, is greater than another predetermined threshold value, for example, 13, the bundle sensing unit 606 may determine the water leaks in the first bundle. Also, when the third auxiliary value, for example, 11, is greater than the predetermined threshold value, for example, 10, or the fourth auxiliary value, for example, 15, is greater than the other predetermined threshold value, for example, 13, the bundle sensing unit 606 may determine the water leaks in the second bundle.

Specifically, the bundle sensing unit 606 may accurately sense the water leakage occurs in the steam generator or the heat exchanger.

Figure 7:
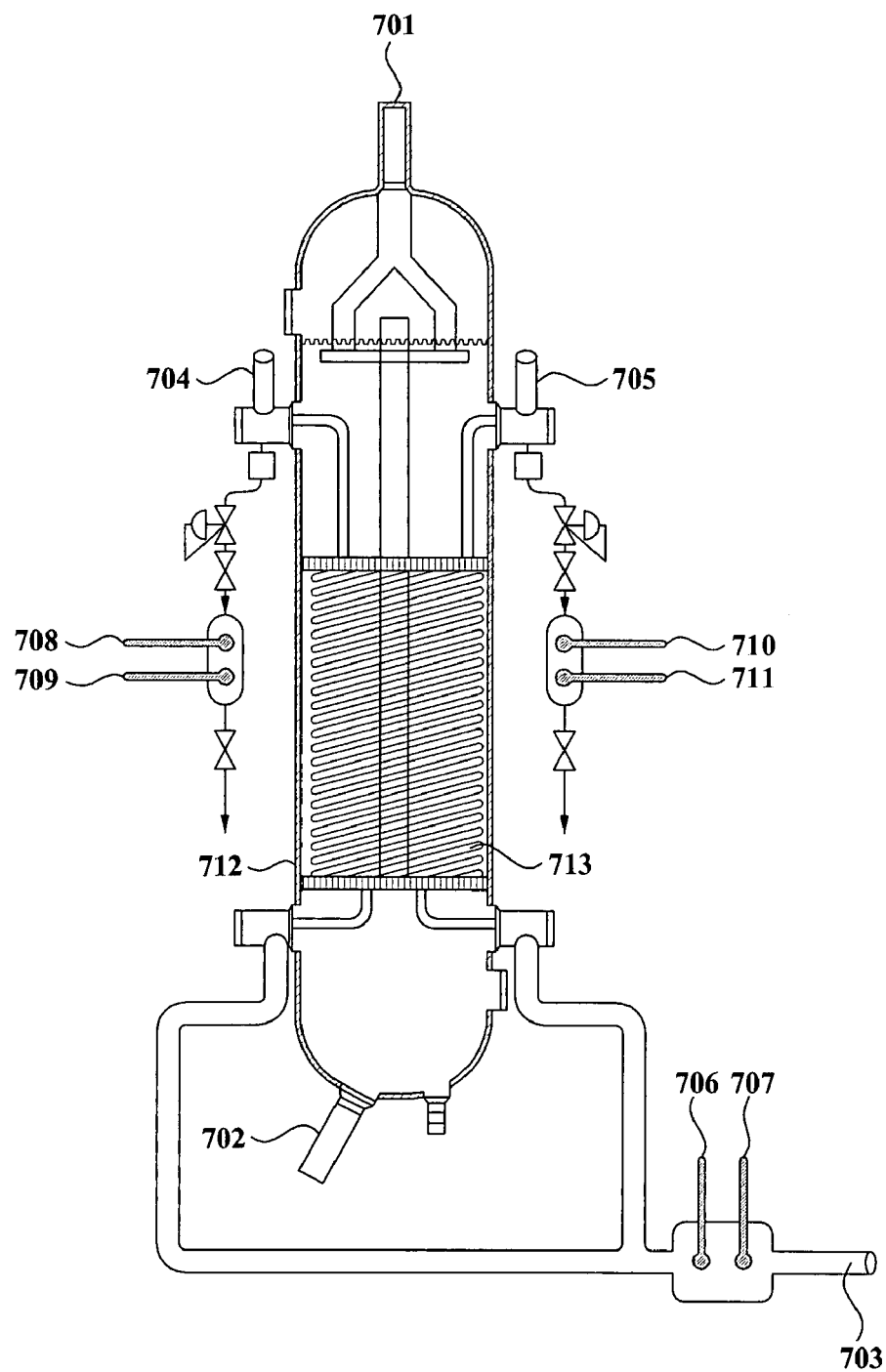
FIG. 7 is a sectional view illustrating a stream generator in a nuclear reactor system using a liquid metal and molten salt according to an embodiment of the present invention.

FIG. 7 is a sectional view illustrating a steam generator in a nuclear reactor system using a liquid metal and molten salt according to an embodiment of the present invention.

Sodium used as a coolant is injected from a sodium injection port 701 of the stream generator, and exhausted from a sodium exhaust port 702 of the stream generator. Water (steam) is injected from an inlet 703 to the stream generator, and exhausted to an outlet 1 704 and an outlet 2 705.

An electrical conductivity sensor 706, installed in the inlet 703, measures an electrical conductivity at the inlet 703. Also, a sampling port 707, mounted in the inlet 703, measures a mass spectrum at the inlet 703.

Also, an electrical conductivity sensor 708, mounted in the outlet 1 704, measures an electrical conductivity at the outlet 1 704. Also, a sampling port 709, mounted in the outlet 1 704, measures a mass spectrum at the outlet 1 704.

Also, an electrical conductivity sensor 710, mounted in the outlet 2 705, measures an electrical conductivity at the outlet 2 705. Also, a sampling port 711, mounted in the outlet 2 705, measures a mass spectrum at the outlet 2 705.

Accordingly, a system for early sensing of water leakage may sense water leakage by dividing the steam generator into a first bundle 712 and a second bundle 713.

Figure 8:
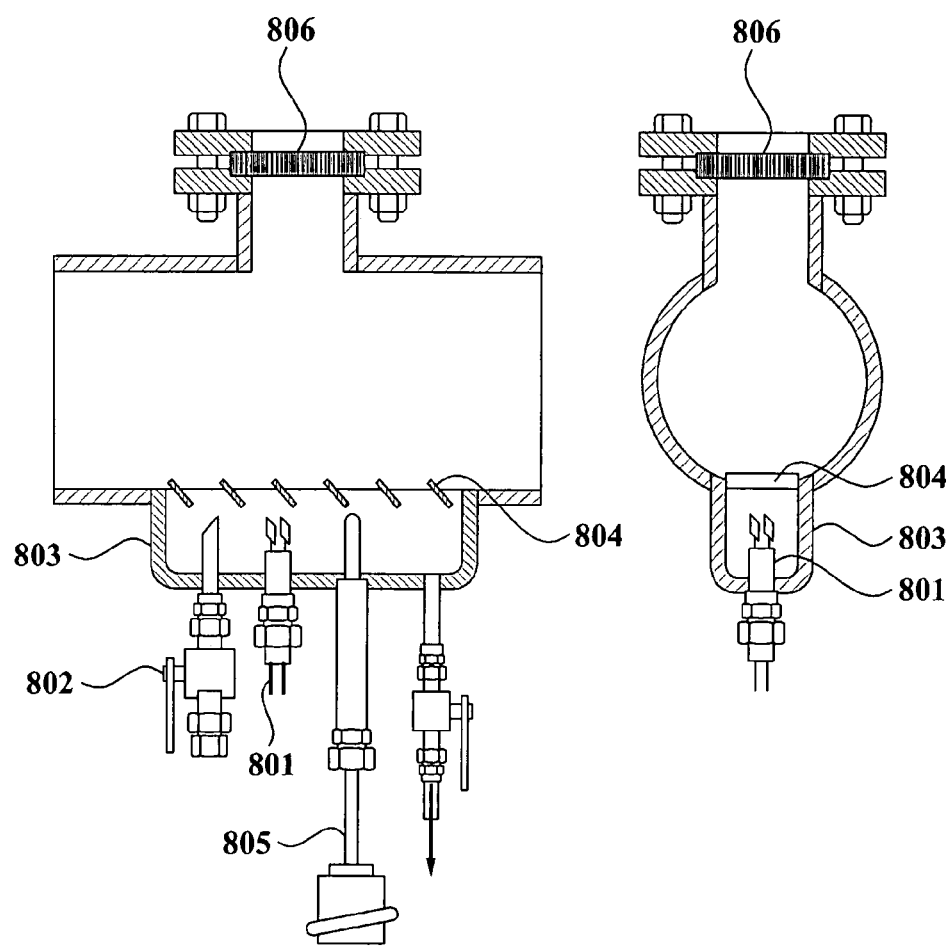
FIG. 8 is a sectional view illustrating an electrical conductivity sensor or a sampling port according to an embodiment of the present invention.

FIG. 8 is a sectional view illustrating an electrical conductivity sensor or a sampling port according to an embodiment of the present invention.

The electrical conductivity sensor 801 or the sampling port 802 may be mounted in a small protuberance 803 in order not to be affected by a speed of water flow. Also, a baffle plate 804 may prevent fluid dynamic energy due to water flow from being added to an electrical conductivity sensor or a sampling port. In this instance, a temperature sensor 805 may be also mounted to correct a temperature. Further, a sight glass 806 may be mounted to check the electrical conductivity sensor 801 and the temperature sensor 805.

Figure 9:
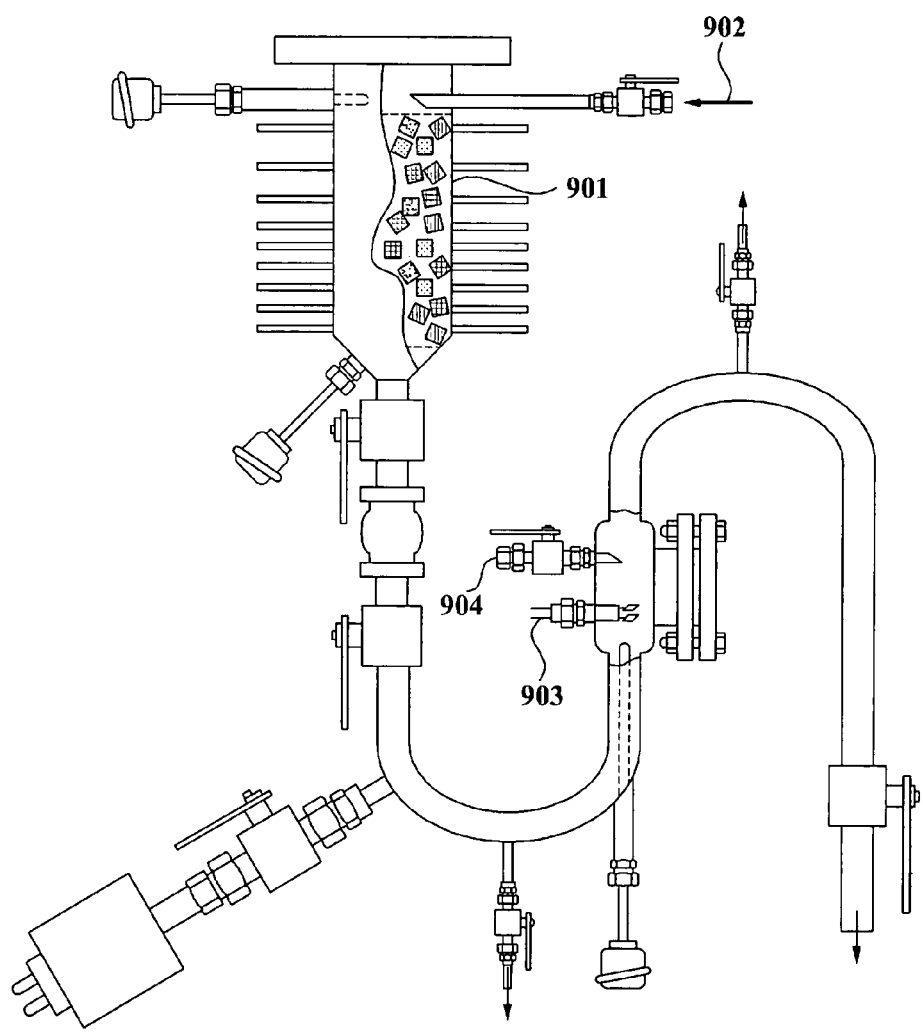
FIG. 9 is a sectional view illustrating an apparatus where an electrical conductivity sensor or a sampling port is installed according to an embodiment of the present invention.

FIG. 9 is a sectional view illustrating an apparatus where an electrical conductivity sensor or a sampling port is installed according to an embodiment of the present invention.

A condensate producing reactor 901 collecting steam condensate is mounted in a water (steam) outlet pipe 902 of a steam generator.

An electrical conductivity sensor 903 or a sampling port 904 measures an electrical conductivity and a mass spectrum with respect to water (steam) discharged from the condensate producing reactor 901.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a method and system for early sensing of water leakage, through chemical concentration monitoring, in a nuclear reactor system using a liquid metal and molten salt may sense water leakage (steam leakage), due to a crack in a steam generator or a heat exchanger included in the nuclear reactor system using the liquid metal and molten salt, early and thereby may help the steam generator or the heat exchanger to control the water leakage (steam leakage).

According to the present invention, a method and system for early sensing of water leakage, through chemical concentration monitoring, in a nuclear reactor system using a liquid metal and molten salt may sense water leakage (steam leakage), due to a crack in a steam generator or a heat exchanger included in the nuclear reactor system using the liquid metal and molten salt, early and thereby may prevent a shutdown of nuclear reactor.

According to the present invention, a method and system for early sensing of water leakage, through chemical concentration monitoring, in a nuclear reactor system using a liquid metal and molten salt may sense water leakage (steam leakage), due to a crack in a steam generator or a heat exchanger included in the nuclear reactor system using the liquid metal and molten salt, early and thereby may prevent a shutdown of the steam generator or the heat exchanger included in the nuclear reactor system using the liquid metal and molten salt.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of early sensing of water leakage, through chemical concentration monitoring, in a nuclear reactor system using a liquid metal and molten salt, the method, implemented by a computer, comprising:

measuring an electrical conductivity of a first channel and a second channel of a steam generator or a heat exchanger, the first channel including an outlet 1 and an outlet 2 and the second channel including an inlet;

performing at least one of a dilution correction and a temperature compensation with respect to the measured electrical conductivity;

calculating a first difference value between a corrected electrical conductivity of the outlet 1 and a corrected electrical conductivity of the inlet based on a method using a Wheatstone Bridge circuit;

calculating a second difference value between a corrected electrical conductivity of the outlet 2 and the electrical conductivity of the inlet based on the method using the Wheatstone Bridge circuit;

calculating an identification value associated with the water leakage in the steam generator or the heat exchanger by summing a first comparison value and a second comparison value, the first comparison value being outputted by comparing a predetermined threshold value with the calculated first difference value and the second comparison value being outputted by comparing the predetermined threshold value with the calculated second difference value;

attempting to sense water leakage by comparing the calculated identification value and a reference value; and determining that the water leakage is sensed when the identification value is greater than the reference value, in which case a leakage alarm is raised; and determining that no water leakage is sensed when the identification value is less than or equal to the reference value, wherein the first comparison value is one of 0, 1 and the first difference value, and the second comparison value is one of 0, 1 and the second difference value.

2. The method of claim 1, wherein:

the first channel comprises an m (m being a natural number) number of outlets, the second channel comprises an n (n being a natural number) number of inlets, and the measuring of the electrical conductivity comprises measuring an electrical conductivity of each of the m number of outlets and the n number of inlets.

3. The method of claim 2, wherein the calculating of the difference value comprises:

computing a difference value between an electrical conductivity of a single random outlet of the m number of outlets and an electrical conductivity of a single random inlet of the n number of inlet.

4. The method of claim 1:

wherein the performing of the dilution correction or the temperature compensation comprises:

correcting the measured electrical conductivity to be consistent with a standard temperature or a standard dilution which are used for determining when water has leaked.

5. The method of claim 1, wherein the steam generator or the heat exchanger included in the nuclear reactor system using the liquid metal and the molten salt which is any one of a liquid metal reactor, a sodium cooled fast reactor, a nuclear transmutation, a pressurized water reactor, and a heavy water reactor.

* * * * *